Nov. 19, 1935.          C. DORNIER          2,021,481
FOLDING PROPELLER
Filed Feb. 1, 1934
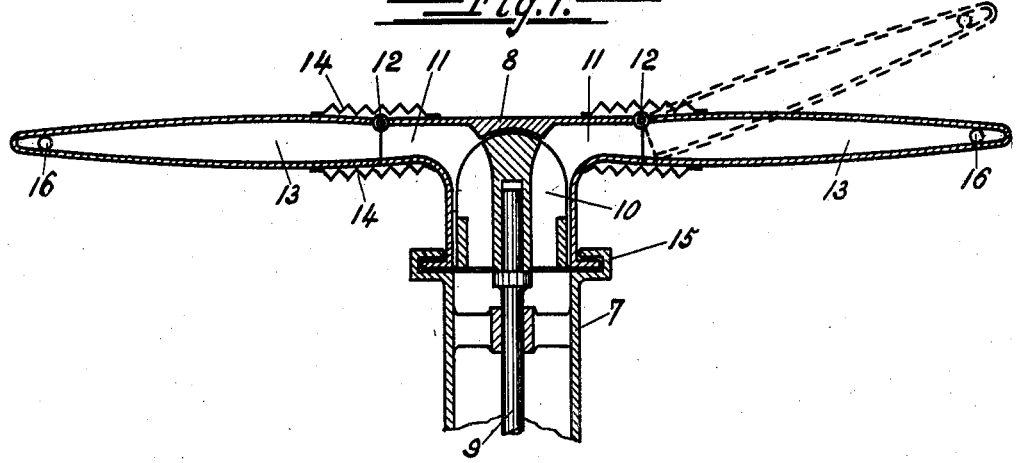
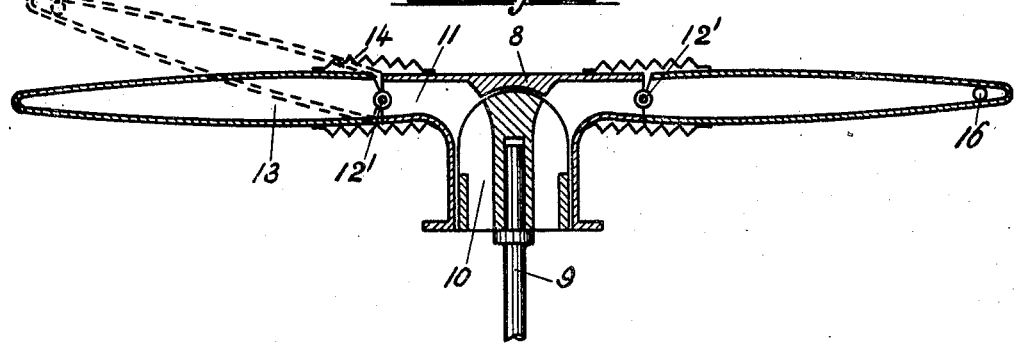
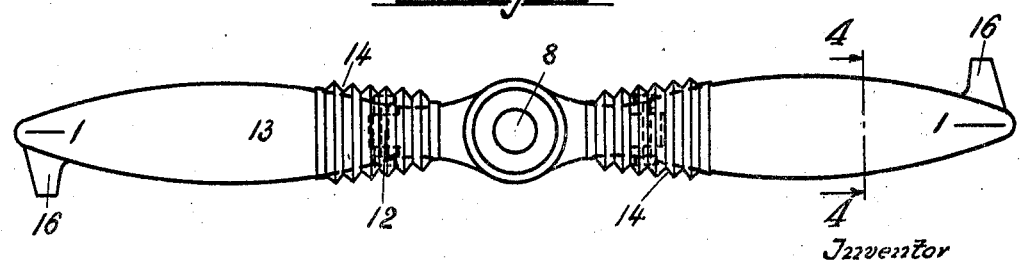
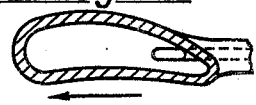
Inventor
Claude Dornier
per Karl A. May
Attorney.

Patented Nov. 19, 1935

2,021,481

UNITED STATES PATENT OFFICE 2,021,481

FOLDING PROPELLER

Claude Dornier, Friedrichshafen, Germany

Application February 1, 1934, Serial No. 709,254
In Germany February 11, 1933

6 Claims. (Cl. 170—164)

This invention relates to rotors for flying machines, more particularly to rotors having foldable wings.

An object of this invention resides in the provision of a hollow foldable wing system securing utmost radial and circumferential stability.

Another object of this invention is the provision of a design of a hollow foldable wing system of best aerodynamic outside contour.

An object of my invention resides in the provision of a rotor for flying machines consisting of a system of hollow wings loosely hinged to the shaft and requiring no stay wires or the like for maintaining the relative position of the wings pertaining to one rotor with respect to one another.

A further object of my invention is to provide a rotor for flying machines consisting of a plurality of hollow wings, said wings being swingably movable in axial direction but rigidly maintaining their radial position with respect to one another and constituting practically no air resistance.

Further and other objects of the present invention will be hereinafter set forth in the accompanying specification and claims and shown in the drawing which, by way of illustration, shows what I now consider to be a preferred embodiment of my invention.

In many applications it is advantageous to arrange the individual wings of a rotor or propeller hinged to the hub of the rotor. The wings are moved outward by the action of the medium in which they operate and by the centrifugal forces. The usual way of doing this is to provide a hinge for the individual wings as close to the rotor shaft as possible and to interconnect the individual wings by stay wires or the like. These stay wires, however, are likely to form loops at certain positions of the wings, increase in the case of aircraft, the air resistance, generally cause inconvenient conditions and are therefore undesirable. As long as the hinges are arranged immediately adjacent to the hub, where the cross section of the wing is small, the joints are liable to wabble, and stay wires or the like must be provided to interconnect the individual wings and to stiffen the system. I propose providing the hub with extensions constituting a part of the wings and to hinge the other part of the wings to said extensions and to arrange the movable joints at a point of the wing where the cross section is large, particularly in the plane of rotation of the wing, and the stresses caused by centrifugal forces are comparatively small. The hinge bolt is long, and the hinge has a broad basis in the plane of rotation and is therefore rigid and stiff in this plane so that special stiffening means are not necessary. Stops limiting the movement of the wings may be provided. If the wings are driven by the reactive force of a current of air or other medium passing through the interior of the wings, the joints must permit an unobstructed flow of the medium therethrough, and flexible air-tight means must be provided to tighten the joint to the outside without interfering with the movability of the joint.

In the drawing:

Fig. 1 is a cross sectional view through a pneumatically operated rotor according to my invention, the section being taken along line 1—1 in Fig. 3, that is, through the longitudinal axis of the wings and parallel to the revolving axis.

Fig. 2 is a cross sectional view through a modified pneumatically operated rotor according to my invention, the section being taken through the longitudinal axis of the wings and parallel to the revolving axis.

Fig. 3 is a top view of a propeller according to Figs. 1 and 2.

Fig. 4 is a cross sectional view through a propeller according to my invention taken along line 4—4 in Fig. 3.

Referring more particularly to the drawings, these illustrate rotors embodying the before described features. Like parts are designated by like numerals in the figures.

The rotors are operated by making use of the reaction principle. The flow of the operating air through the interior of the hollow wings 13 is produced by the blower 10. The rotor is rotatably connected with the end 7 of the body of the airplane or the like by means of the axial and radial bearing 15. Blower 10 is driven by shaft 9. Hub 8 of the rotor carries a plurality of extensions or arms 11 corresponding in number to the number of wings 13. The hollow wings are connected to the arms 11 by the hinges 12. Leakage of operating air is prevented by the provision of flexible airtight means 14 which may be made of leather or of other suitable flexible material. Hinges 12 are arranged on the upper side of the wings, whereby an efficient stop against a downward movement and hanging down of the wings is established. The compressed gas or air emerges through the nozzles 16 which are near the outer ends of the wings. This causes a reaction which results in the rotation of the propeller.

Fig. 2 is an arrangement closely resembling the one illustrated by Fig. 1, differing only in so far as hinges 12' are arranged in or near the center plane of the wings, permitting the provision of an efficient stop limiting the movement of the wing out of both sides of the plane of rotation of the wings. The wings can freely move upward with respect to the plane of rotation of the wings under the influence of the currents of air surrounding the rotor. This cushions the action of the rotor. No stiffening means are needed which would disturb the freedom of the air flow and the operation of the wings.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. A rotor for flying machines comprising a hollow hub provided with hollow extensions, hollow blades having reaction means for driving said blades, and hinge means movably interconnecting said extensions and blades and adapted to allow an operating medium to pass from said extensions into said blades.

2. A rotor for flying machines comprising a hollow hub provided with hollow extensions, hinge means connected with said extensions, hollow blades movably connected to said hinge means, said extensions and blades having substantially two operating surfaces, said hinge means being located between said two surfaces, said blades having reaction means for driving said blades.

3. A rotor for flying machines comprising a hollow hub provided with hollow extensions, hinge means connected with said extensions, hollow blades movably connected to said hinge means, said extensions and blades having substantially two operating surfaces, said hinge means being located between said two surfaces and distant from either surface, said blades having reaction means for driving said blades.

4. A rotor for flying machines comprising a hollow hub provided with hollow extensions, hollow blades having reaction means for driving said blades, and hinge means movably interconnecting said extensions and blades and adapted to allow an operating medium to pass from said extensions into said blades, said extensions and said blades having abutments cooperating with one another and limiting the movement of said blades.

5. A rotor for flying machines comprising a hollow hub provided with hollow radial extensions, hinge means associated with said extensions, hollow blades movably connected to said hinge means, flexible airtight means around said hinge means, and reaction means associated with said blades for driving said blades.

6. A rotor for flying machines comprising a hollow hub provided with hollow radial extensions, hinge means associated with said extensions, hollow blades movably connected to said hinge means, said extensions and blades having substantially two surfaces, said hinge means being located in between said two surfaces, flexible airtight means around said hinge means, and reaction means associated with said blades for driving said blades.

CLAUDE DORNIER.